United States Patent
Bress et al.

(10) Patent No.: US 7,228,379 B2
(45) Date of Patent: Jun. 5, 2007

(54) SYSTEMS AND METHODS FOR REMOVING DATA STORED ON LONG-TERM MEMORY DEVICES

(76) Inventors: Steven Bress, 17917 Wheatridge Dr., Germantown, MD (US) 20874; Dan Bress, 17917 Wheatridge Dr., Germantown, MD (US) 20874; Mike Menz, 1335 Champagne Cir., Roseville, CA (US) 95747; Mark Joseph Menz, 114 Rawlings Ct., Folsom, CA (US) 95630

( * ) Notice: Subject to any disclaimer, the term of this patent is extended or adjusted under 35 U.S.C. 154(b) by 442 days.

(21) Appl. No.: 10/174,984

(22) Filed: Jun. 20, 2002

(65) Prior Publication Data

US 2002/0196572 A1 Dec. 26, 2002

Related U.S. Application Data

(60) Provisional application No. 60/299,783, filed on Jun. 21, 2001.

(51) Int. Cl.
*G06F 12/06* (2006.01)
*G06F 12/08* (2006.01)

(52) U.S. Cl. .............. 711/112; 711/105; 711/115; 711/170

(58) Field of Classification Search ........ 711/112, 711/115; 345/174, 157; 361/212; 710/306
See application file for complete search history.

(56) References Cited

U.S. PATENT DOCUMENTS

| | | | |
|---|---|---|---|
| 4,717,975 A | 1/1988 | Ogura et al. ............... 360/66 |
| 5,630,093 A * | 5/1997 | Holzhammer et al. ....... 711/115 |
| 5,721,665 A | 2/1998 | Schultz ....................... 361/149 |
| 5,777,811 A * | 7/1998 | Bodo ........................... 360/15 |
| 5,861,873 A * | 1/1999 | Kikinis ....................... 345/157 |
| 5,953,199 A * | 9/1999 | Owens ........................ 361/212 |
| 5,966,732 A * | 10/1999 | Assaf .......................... 711/170 |
| 5,969,933 A | 10/1999 | Schultz et al. .............. 361/149 |
| 6,629,184 B1 * | 9/2003 | Berg et al. .................. 710/306 |
| 6,727,894 B1 * | 4/2004 | Karidis et al. ............. 345/174 |
| 2004/0078514 A1 * | 4/2004 | Kung et al. ................. 711/105 |

OTHER PUBLICATIONS

Friedhelm Schmidt, The SCSC BUS and IDE Interface, Addion-Wesley, 1995.*
http://en.wikipedia.org/wiki/univac univac history.*
Microsoft computer dictionary 1997.*

* cited by examiner

*Primary Examiner*—Kevin L. Ellis
*Assistant Examiner*—Duc T Doan (57) ABSTRACT

An application specific device for erasing data from a long-term storage device includes a power supply, a control circuit, and an interface to the storage device. The control circuit controls the long-term storage device to irretrievably remove data from the storage device. The storage device may be, for example, a hard disk drive or compact flash memory. The application specific device is physically small, is operating system independent, and has simple interface that is useable by non-computer professionals.

3 Claims, 10 Drawing Sheets

SYSTEMS AND METHODS FOR REMOVING DATA STORED ON LONG-TERM MEMORY DEVICES

RELATED APPLICATION

This application claims priority under 35 U.S.C. §119 based on U.S. Provisional Application No. 60/299,783, filed Jun. 21, 2001, the disclosure of which is incorporated herein by reference.

BACKGROUND OF THE INVENTION

A. Field of the Invention

The present invention relates to computer memory devices and, more specifically, to mechanisms for removing data from memory devices.

B. Description of Related Art

Confidential information, such as credit card numbers, passwords, and personal account login information is often stored on computer hard drives. Confidential information stored on paper can be shredded when it is no longer required. Computer long-term memory devices, such as hard drives, however, are not as easy to destroy. Even if physically crushed with a hammer, the hard drive is likely to still have recoverable data left on its magnetic media.

Not only is it difficult to physically destroy long-term memory storage devices, these devices have intrinsic value and could be reused. For example, some users replace their long-term memory storage devices for larger and/or faster devices. A graphic artist may need a bigger/faster long-term memory storage device than say a writer. While a device may no longer have value to the graphic artist, the writer may find value in that device. Some users routinely replace their entire functioning computer, which includes one or more long-term memory storage devices. These replaced computers will often have value. However, in order to be able to securely reuse these long-term memory storage devices, it is desirable to first securely remove the stored data.

Simply deleting files on a drive does not normally remove the data from the drive media. Instead, pressing the delete key on most computers simply causes a change to be made to the FAT (File Allocation Table) that keeps track of where data is stored on the hard drive. The data itself remains on the hard drive. It is trivial to recover "deleted" data using off-the-shelf software.

One conventional software method of irretrievably deleting files is by "formatting" the media through a software format command. The format command typically rewrites a small area of the drive that contains its table of contents with a blank table of contents. It may also rewrite the file allocation table to indicate that all of the space on the disk is available. While a novice computer user would see a formatted drive as clean, one skilled in the art would have no problem recovering data or even complete files from a disk formatted in this manner.

Another method of implementing the format command consists of writing the value "0" to the entire hard drive. This is much stronger protection from a casual attempt to recover data from a drive treated in this fashion. However, even with this type of format command, data can still be recovered.

In order to assist the understanding of how data can be recovered from a hard drive that has been overwritten with zeroes, a basic description of hard drive operation will now be given. A hard drive includes three main components: (1) magnetic media, (2) media control electronics, and (3) a read/write head. A hard drive is commonly conceptualized as pockets of magnetic media surrounded by null media. In practice, however, it is often impractical to manufacture hard drives in this fashion. A hard drive may consist of contiguous magnetic media, any part of which may be magnetized. The read/write head is directed by the media control electronics to move to a specific location over the magnetic media and read and/or write at that location. For each bit of data, the media control electronics reserves a location on the magnetic media that is larger than the read/write head.

The hard drive uses changing patterns of magnetism to represent digital data. For example, if the magnetic field of an area is polarized in one direction, the data is declared to be a one. If the polarization is in the other direction, the data is a zero. In the real world, the strength of the polarization may be quite different from one data area to the next.

Figure 1:
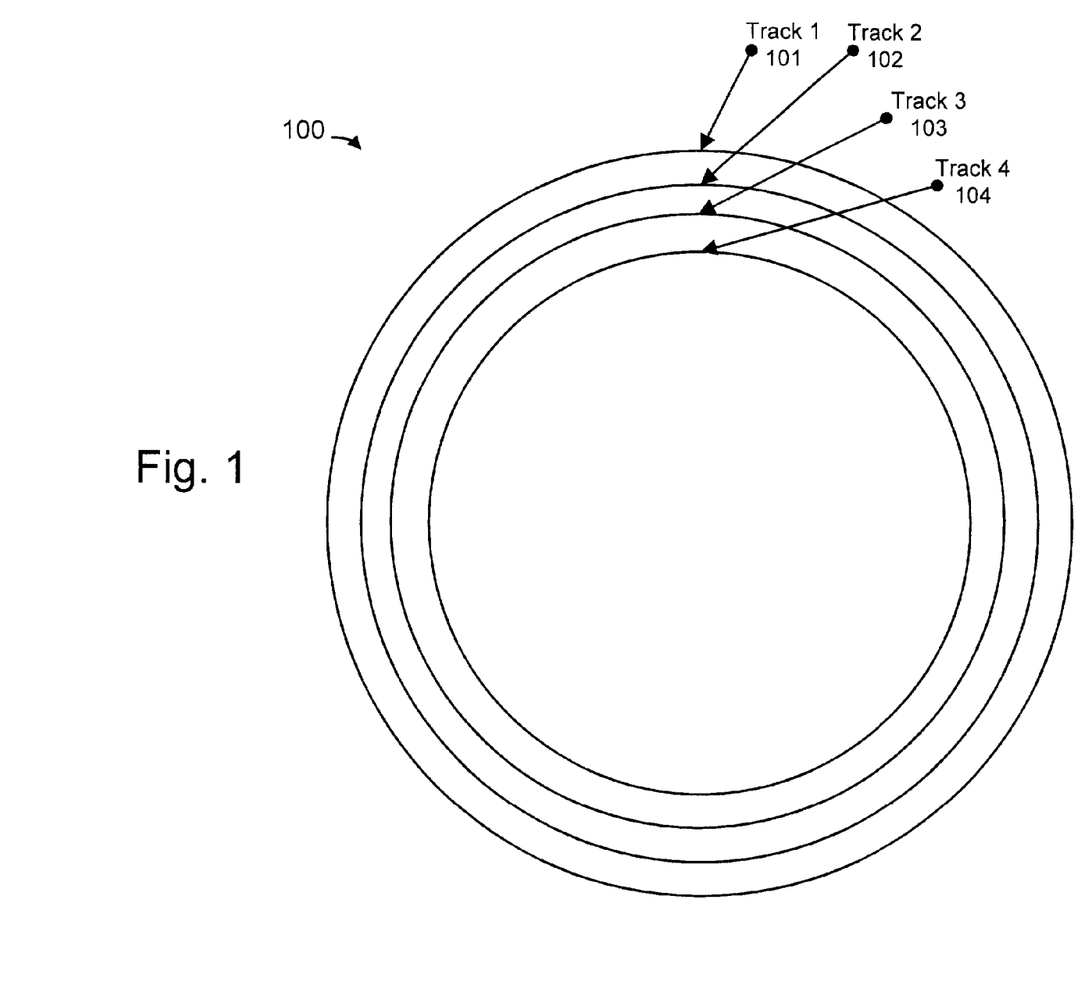
FIG. 1 is a diagram illustrating tracks on a disk drive.

As mentioned, polarization is over an area. The size of the area is determined by a number of factors, but the principal ones are the size of the recording head, the type of recording media, and the speed of the magnetic platter. As the magnetic platter spins under the recording head, the head traces out one track. An actuator in the hard drive moves the head in discrete steps. Each one of these steps defines another track on the drive. FIG. 1 is a diagram illustrating multiple tracks 101–104 on a platter of a hard drive 100. The term "step time" describes the time the head takes to get from one track, such as track 101, to a next track, such as track 102. The term "seek time" describes the time that it takes for the head to get from any one track to any other track.

In the real world, there is no guarantee that the head will be aligned over a track in precisely the same location each time the head moves, although it will typically be close enough to the track to read and write data reliably. Reasons for this potential miss-alignment include thermal expansion and contraction of the disk platters. If the operating temperature of the drive changes, the platters may shrink or expand. The actuator that moves the head may also change its performance over time. On any given motion, there may be a slight overshoot, undershoot, or even a small oscillation in the head as it moves. Drive manufacturers may recommend reformatting drives regularly so that these changes do not cause any data loss.

Thus, a track of data on a disk drive is generally not a perfect circle with a fixed width. The track may be circular, but its width may vary greatly from the theoretically ideal. In normal operation, this is mostly irrelevant. However, when trying to irretrievably delete data by overwriting the data with "zeros," there is likely to be remnants of the old data on the edges of the track. This data may potentially be recovered.

Figure 2A:
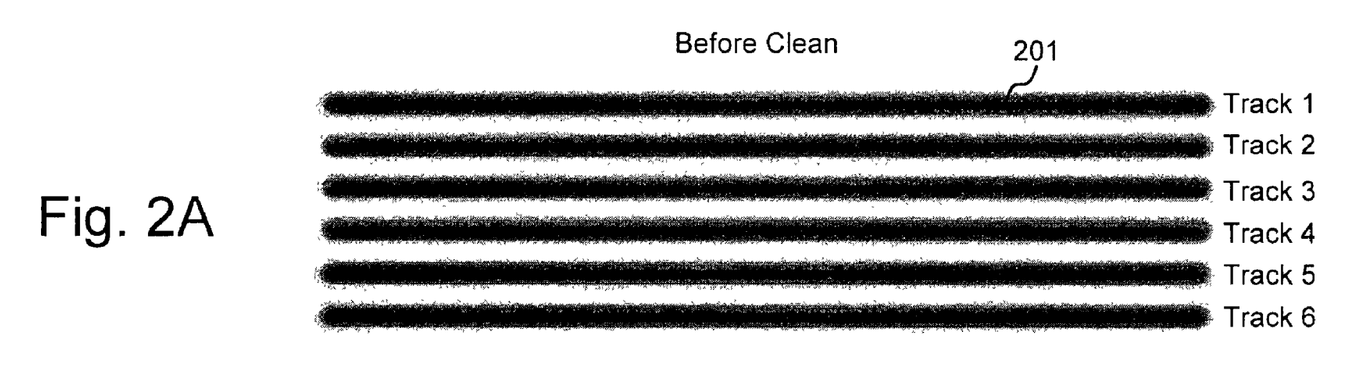
FIGS. 2A and 2B illustrate data stored in the magnetic media of a disk drive.
Figure 2B:
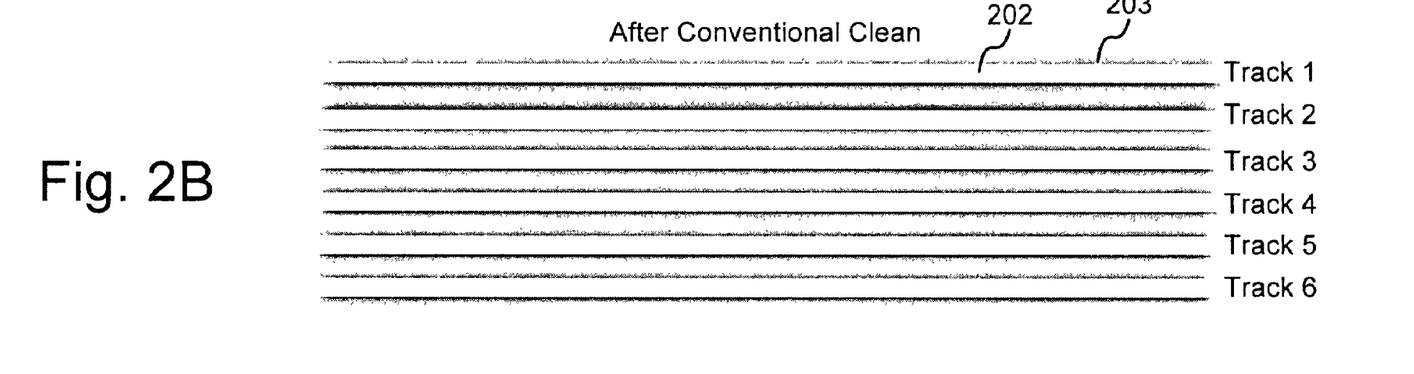

FIGS. 2A and 2B illustrate the above-discussed concept of erased data remaining on the edges of a track. FIG. 2A illustrates a number of tracks (labeled as tracks 1–6) on a magnetic platter in which darker areas 201 on each track represent magnetic changes that can be interpreted as data. FIG. 2B illustrates the same tracks after a conventional clean implemented by rewriting zeros over each bit. The central dark area is now a uniform white area 202 with a fuzzy area 203 to either side. Fuzzy area 203 includes residual magnetism that could be interpreted by someone with the correct equipment.

Simply deleting files on a hard disk or formatting the hard disk may fail to remove all of the data for another reason. The disk may be set up with more than one partition. When a hard disk is set up for use by a computer, the allocation of storage space must be specified. In many cases, the entire hard drive is assigned to be in a single partition. In other cases, there may be reason to create two or more partitions. Each partition can be used to hold data in different formats, such as one partition used for Microsoft Windows data, and another partition used for Linux data. Or, in the case of Windows, multiple partitions may be set up so that the drive appears to be a number of small drives, rather than one large drive.

This common scenario presents a couple of problems. In the case where different partitions hold different formats of data, it may not be possible to access one of the partitions for file deletion or formatting. Windows may not make the Linux partition visible, so there would be nothing to delete. Even with multiple partitions of the same data type, the data in the partitions may all be visible to the user, but it would be up to the user to know enough to delete all of the data in all of the partitions assigned to a single drive. For untrained personnel, this might be difficult to determine, so for them, the data may appear "hidden."

Software solutions exist that attempt to overcome the above problems in permanently removing data from hard drives. These solutions involve running software on a single computer to eliminate data on that computer's hard drive. These solutions are not without disadvantages. First, these solutions tend to be operating system dependent, and the operating system must be running properly. Second, at least a moderately trained computer operator must select the proper software, install the software, run the software, and then verify the results. This can be technically difficult, as the operating system files are being eliminated along with all other files. Third, these software solutions can be time consuming. For example, assume a computer professional is given seven computer systems by her company and is tasked with removing data on the drives before recycling the computer systems. In order to use this system of data removal, the computer professional would have to hook up seven monitors, seven keyboards, and seven mice to seven computers. She would then have to turn on seven computers, identify the operating system of each computer, and choose the proper software to run on each one. If there were a power interruption during this process, she may have to format the drives, reinstall the operating system, and then continue with data removal. Thus, this can be a time intensive removal method.

Other conventional software approaches to permanently removing data involve using a first computer as a data removal station for a second computer or drive. The first computer is set up to run data removal software. The user connects the drive to be "cleaned" to this computer. There are a number of potential problems with this approach. First, an expensive PC must be taken from productive service, along with the desk space needed to support its keyboard, monitor and mouse. Second, a trained user must attach the target drive to the host machine. During this process, the host machine must be shut down, the target drive properly installed and configured with a valid address or master/slave status, and finally the host machine rebooted. This can be a time consuming process requiring a trained user. Finally, there is a potential system problem. Most PCs are not designed for hard drives being swapped in an out on a regular basis. A static charge, or cable failure while installing a target drive can damage not only the target drive but also the host machine.

Accordingly, there is a need in the art to more efficiently delete data from long-term memory devices such as hard drives.

SUMMARY OF THE INVENTION

Systems and methods consistent with the principles of this invention provide for an easy to use and portable long-term memory cleaning device.

One aspect of the invention is directed to a device for removing data from a long-term memory component. The device includes an interface for connecting the device to the long-term memory component and a control circuit configured to control the long-term memory component through the interface to permanently remove data from the long-term memory component. A user controllable switch, when actuated by a user, causes the control circuit to commence permanently removing the data from the long-term memory component.

A method consistent with aspects of the invention includes connecting a power supply to a cleaning device, connecting a cable associated with the cleaning device to a long-term memory component in a computer, and powering-up the computer. The method further includes activating the cleaning device via a switch attached to the cleaning device, permanently removing data from the long-term memory component, and signaling completion of the data removal from the long-term memory component.

Another method consistent with aspects of the invention includes connecting a power supply to a cleaning device, connecting a cable associated with the cleaning device to a long-term memory component, and connecting a power cable attached to the cleaning device to the long-term memory component. The method further includes activating the cleaning device via a switch attached to the cleaning device, permanently removing data from the longterm memory component, and signaling completion of the data removal from the long-term memory component.

Yet another aspect of the invention is directed to a device for removing data from a long-term memory component. The device includes LEDs configured to provide feedback relating to an operational status of the device to a user, a user settable switch, and an interface for connecting to a long-term memory component. The device further includes circuitry coupled to the LEDs, the user settable switch, and the interface, the circuitry configured, when the switch is actuated by the user, to communicate with the long-term memory component through the interface and control the long-term memory component to permanently remove the data therefrom. The circuitry is enclosed in a portable casing and the LEDs, the user controllable switch, and the interface are mounted on an external portion of the casing.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

A cleaning device for erasing long-term memory devices, such as hard drives, includes a host circuit that directs a target drive's read/write head to perform specific actions relating to deleting the data on the target drive. The cleaning device is physically compact, is relatively simple to operate, and is operating system independent.

Storage devices discussed herein may be any type of long-term nonvolatile memory device. For example, the storage device may be a hard disk drive or compact flash memory. In one implementation, the storage device uses an Integrated Drive Electronics (IDE) interface. An IDE interface is a well-known electronic interface that is frequently used to connect a computer's motherboard and disk drive.

Although concepts consistent with the present invention are primarily described herein in relation to an IDE magnetic hard disk drive, these concepts may be implemented with other types of IDE media, such as flash memory with an IDE interface. Flash memories are a special type of semiconductor random access memory that retains its data after power has been removed from the system. Other types of media useable with an IDE interface include magnetic tape. In addition to the IDE interface, concepts consistent with the invention may be applied in a straightforward manner to other types of high level storage interfaces, such as the well known Small Computer System Interface (SCSI) standard or a hard drive connected through an IEEE 1394 (Firewire) connection.

For the sake of clarity the remaining description herein will be described with reference to an IDE magnetic hard disk drive, although, as mentioned above, the concepts of the invention are not limited to such drives. One skilled in the art would appreciate that other modern long-term storage device interfaces share similar functionality that could be incorporated into the concepts described herein.

Cleaning Device

Figure 3:
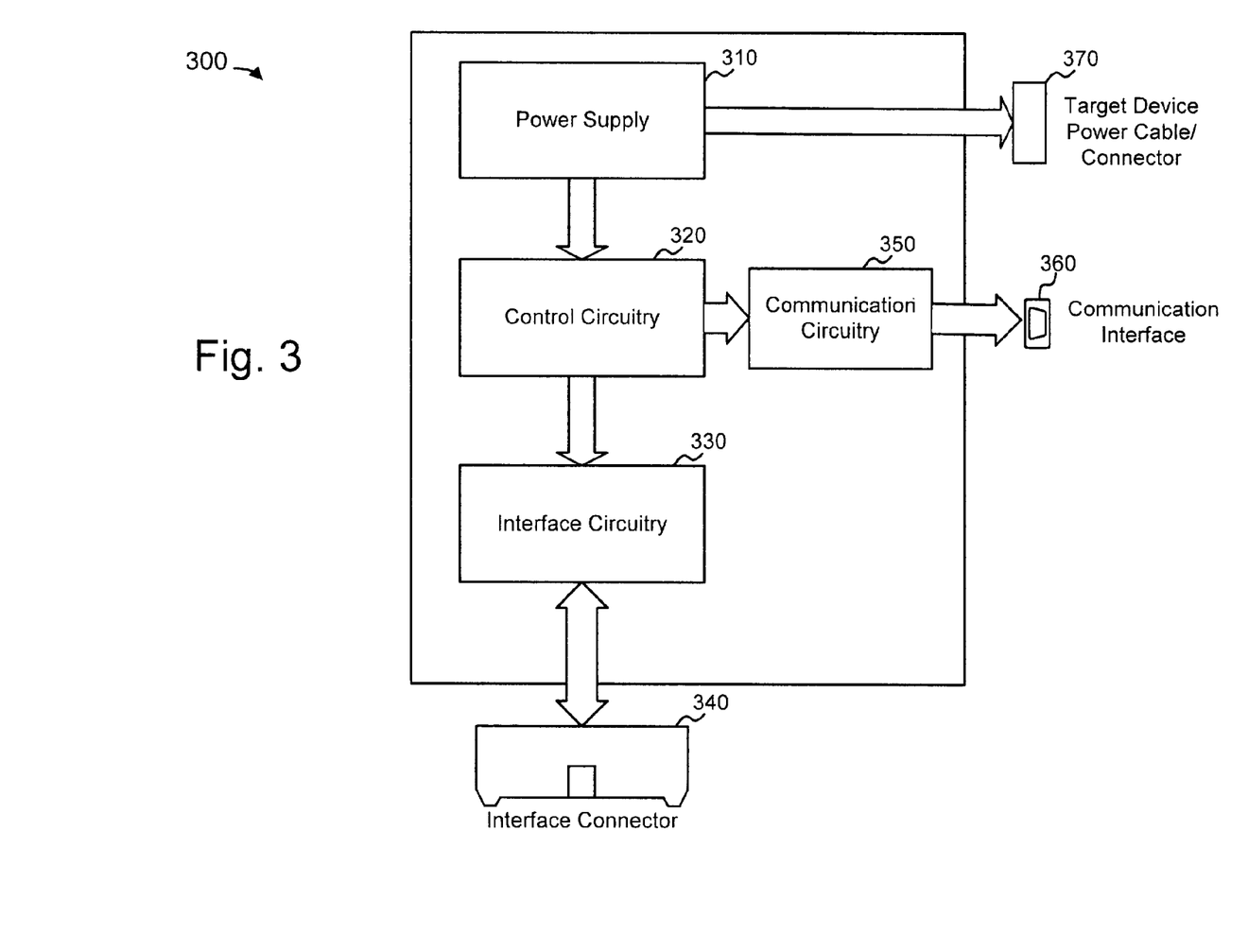
FIG. 3 is a block diagram illustrating a long-term memory cleaning device consistent with an aspect of the present invention.

FIG. 3 is a block diagram illustrating a cleaning device 300 consistent with an aspect of the present invention. Cleaning device 300 includes power supply 310, control circuitry 320, interface circuitry 330, an interface connector 340, and communication circuitry 350. Power supply 310 supplies power through a power cable connector 370 and communication circuitry 350 may connect to a communication interface 360.

A hard disk drive or compact flash drive (target drive) attaches to interface connector 340. As will be described in more detail below, control circuitry 320 detects the capabilities of the target drive and issues commands that result in permanent data removal from the target drive. In other words, the target drive is thoroughly "cleaned" by cleaning device 300. Interface circuitry 330 passes instructions through connector 340 to the target device. Power supply 310 provides power to both control circuitry 320 and interface circuitry 330.

Communication circuitry 350 allows cleaning device 300 to communicate with a host computer, such as a personal computer. Communication interface 360 may be a serial interface that may be connected to a personal computer. Communication circuitry 350 may then handle the serial communication protocols between the personal computer and cleaning device 300. Additionally, instead of connecting to a personal computer, communication interface 360 may be used to interface directly to a stand-alone printer, through which status information may be output. Communication circuitry 350 and communication interface 360 are optional. In one implementation, cleaning device is implemented as a stand-alone device that may be used to permanently remove data from hard drives without using a separate computer.

Cleaning device 300 may be designed as a relatively small, lightweight, and easily portable device. In one implementation, cleaning device 300 is embodied in a case approximately 8"×10"×1.5".

Power cables allow power to be supplied to the target disk drive through power connector 370. This allows cleaning device 300 to process a target drive whether or not the target drive is still connected to a working computer or similar device (host).

Figure 4:
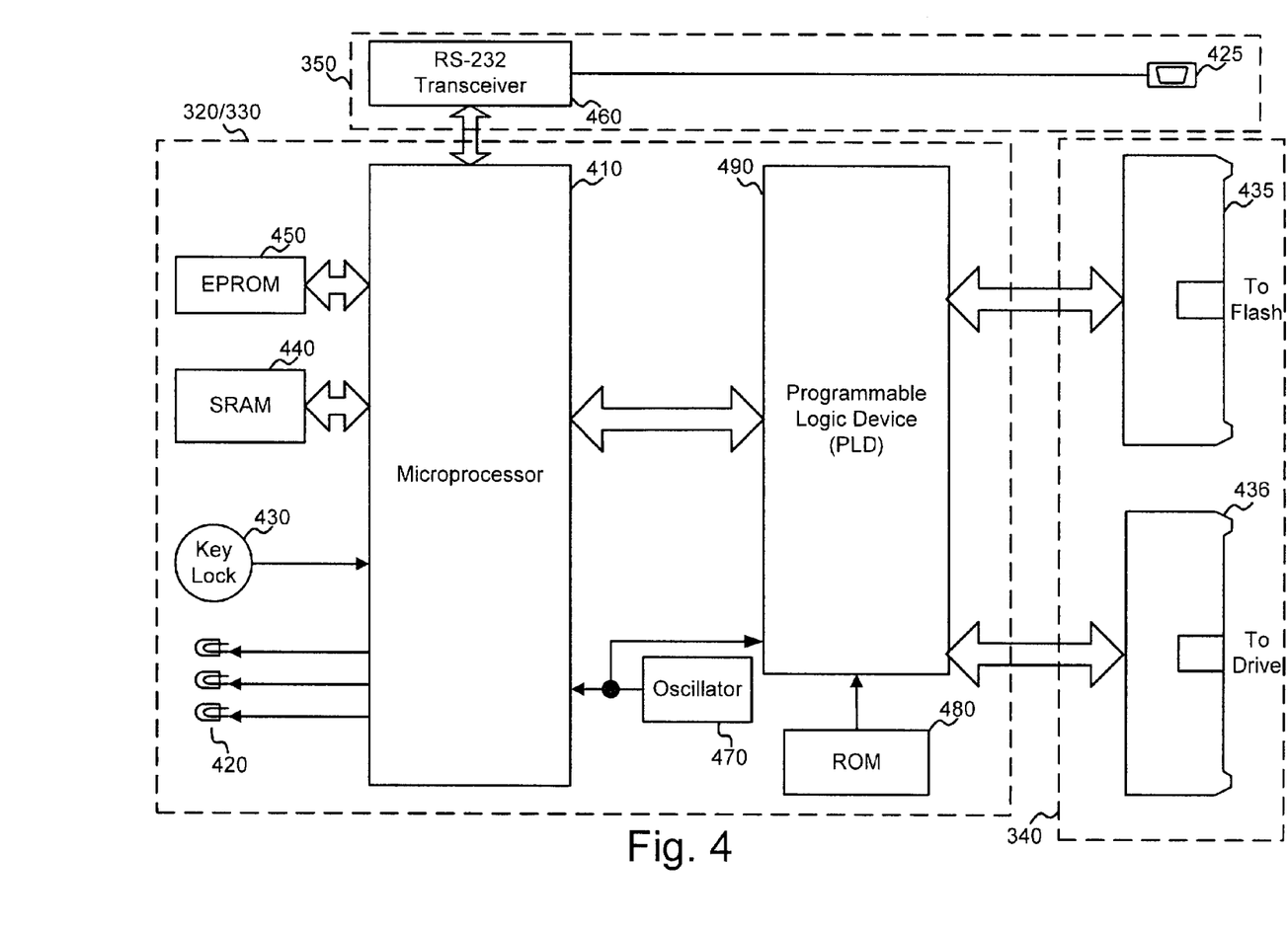
FIG. 4 is a diagram illustrating portions of the cleaning device shown in FIG. 3 in additional detail.

FIG. 4 is a diagram illustrating portions of cleaning device 300 in additional detail. Control circuitry 320 and interface circuitry 330 of cleaning device 300 includes microprocessor 410 and programmable logic device (PLD) 490. Microprocessor 410 may be an embedded processor, such as the 80386 EX embedded processor manufactured by Intel Corporation, of Santa Clara, Calif. The integrated design of microprocessor 410 allows relatively little additional circuitry to be used to create a small, dedicated computer system. PLD 490 complements microprocessor 410 by performing logical operations required by the microprocessor 410 or other circuitry of cleaning device 300. ROM 480 stores configuration data that is initially loaded into PLD 490 on start-up. Similarly, EPROM 450 stores the initial code necessary to initialize and run microprocessor 410. Static RAM (SRAM) 440 is also connected to microprocessor 410, and is used for temporary program and data storage. Crystal oscillator 470 provides clocking signals to microprocessor 410 and PLD 490. In one implementation, crystal oscillator 470 generates a 50 MHz clock signal.

Microprocessor 410 may control a number of external devices, such as LED status indicators 420 and a processor key lock 430. Through LED status indicators 420, microprocessor 410 may provide easily understandable feedback to a user. For example, one of LEDs 420 may be a green LED that is powered by microprocessor 410 when it finishes deleting data from a drive. Alternatively, microprocessor 410 may cause an audible sound to be produced when it finishes deleting data from a drive. Processor key lock 430 is a physical interface through which a user must insert a physical key to enable microprocessor 410.

Interface 340 may include a hard drive interface 436. Drive interface 436 may be a standard IDE drive interface that connects cleaning device 300 to the target drive. Interface 340 may also include a compact flash interface 435 which, in a similar manner, allows cleaning device 300 to connect to and erase compact flash memory devices.

In addition to connecting to the target drive through interface circuitry 340, microprocessor 410 may be connected to external devices via RS-232 port 425 and RS-232 transceiver 460. RS-232 port 425 may be a standard DB9 connector that allows connections using a standard DB9 male to female serial cable.

One of ordinary skill in the art will recognize that the components shown in FIG. 4 may be selected from a wide variety of commercially available components. In one implementation, the components in FIG. 4 may be selected as follows: PLD 490, part number EP1K50QC208-2, available from Altera Corporation of San Jose, Calif.; ROM 480, part number EPC1PC8, available from Altera Corporation; EPROM 450, part number AT27LV020A90JC, available from Atmel Corporation, of San Jose, Calif.; and SRAM 440, part number CY7C1021V33L12ZCT, available from Cypress Corporation, of San Jose, Calif.

Figure 5:
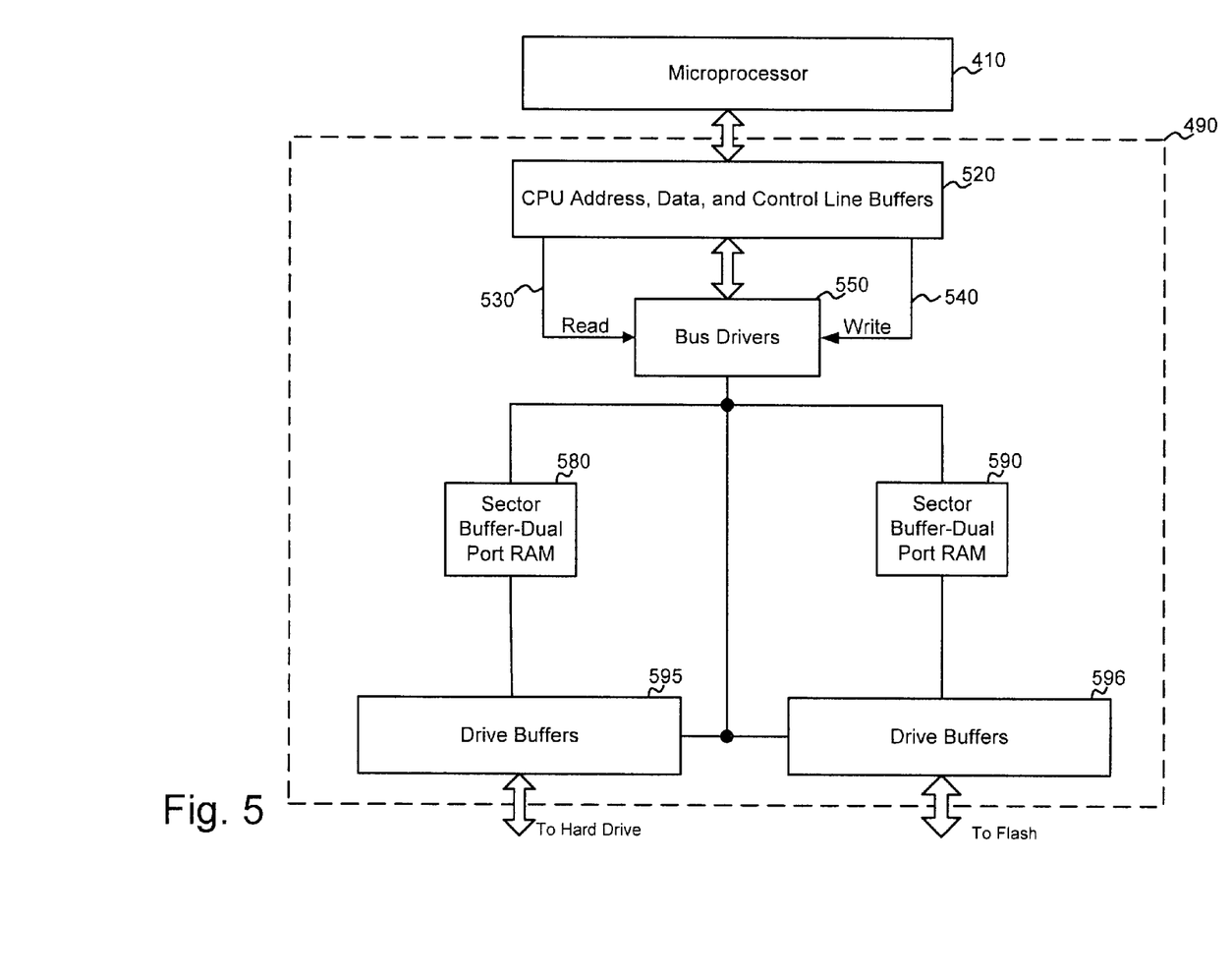
FIG. 5 is a diagram illustrating portions of the cleaning device shown in FIGS. 3 and 4 in additional detail.

FIG. 5 is diagram that graphically illustrates the functionality of PLD 490 in additional detail. Address, data, and control lines from the microprocessor 410 are routed to PLD 490 where their information is buffered and latched as necessary in buffers 520. Buffers 520 serve to reduce the electrical load on the processor and to stabilize the signal timing. Buffer read and write signals 530 and 540 control the direction of the bus drivers 550. Thus, bus drivers 550 may write data into buffers 520 when read signal 530 is active and read data out of buffers 520 when write signal 540 is active. Buffers 520 and bus drivers 550 help control the data flow and distribution of the address and data buses from the microprocessor 410 to other portions of PLD 490.

Buffering and signal conditioning for the target disk drive is provided by drive buffers 595, which form the drive interface with the target disk drive. Buffering and signal conditioning for compact flash is provided by drive buffers 596, which form the interface with the compact flash. Through the bus drivers 550, the microprocessor 510 can directly read and write to the drive interface associated with the target disk drive and compact flash.

Instead of directly communicating with drive buffers 595 and 596, bus drivers 550 may indirectly communicate with drive buffers 595 and 596 through dual ported RAM sector buffers 580 and 590. Sector buffer 580 provides an additional layer of buffering between the microprocessor 410 and the disk drive and/or compact flash. This allows the target drive to write one sector's worth of data to RAM at high speed, while the microprocessor 410 reads a previous sector's worth of data. By allowing the operations to overlap in this fashion, the microprocessor 410 is not restricted to running at the speed of the target drive or compact flash, and is free to handle other functions until it needs the data in the sector buffers 580 or 590.

Referring back to FIG. 4, microprocessor 410 may include a UART that may be used for serial communications. Microprocessor 410 connects to an RS-232 transceiver 425, which buffers the signals and generates the necessary voltages required for RS-232 communications. DB9 connector 425 connects to a corresponding DB9 connector on a host device such as a personal computer. Although communication circuitry 350 is shown as implementing a serial connection, in other implementations, other types of connections, such as parallel or USB connections, may be used.

Operation of the Cleaning Device

Cleaning device 300 operates on a target drive inserted into interface connector 340 to permanently erase the contents of the drive. In general, cleaning device 300 removes data from a hard drive by writing to all data tracks on a drive multiple times with multiple data patterns. Data tracks are not written to sequentially. Instead, they are written in a pattern that forces the head to move from track to track in such a way as to introduce jitter in the absolute head position. Ideally, the head would be positioned a bit to one side of the track in one pass, and a bit to the other in the next pass. To accomplish this, cleaning device 300 controls the drive head to move a minimum of two tracks between writes. For some passes it is moved from an inner track to an outer one, while in other passes it is moved from an outer track to an inner one.

This process of writing with major jumps in head position may be repeated numerous times with different data patterns. By the end of the cleaning process, the motion of the recording heads and the changing data patterns renders the original data unrecoverable. One skilled in the art would appreciate that the longer this process is carried on, the more securely data is removed.

Figure 6:
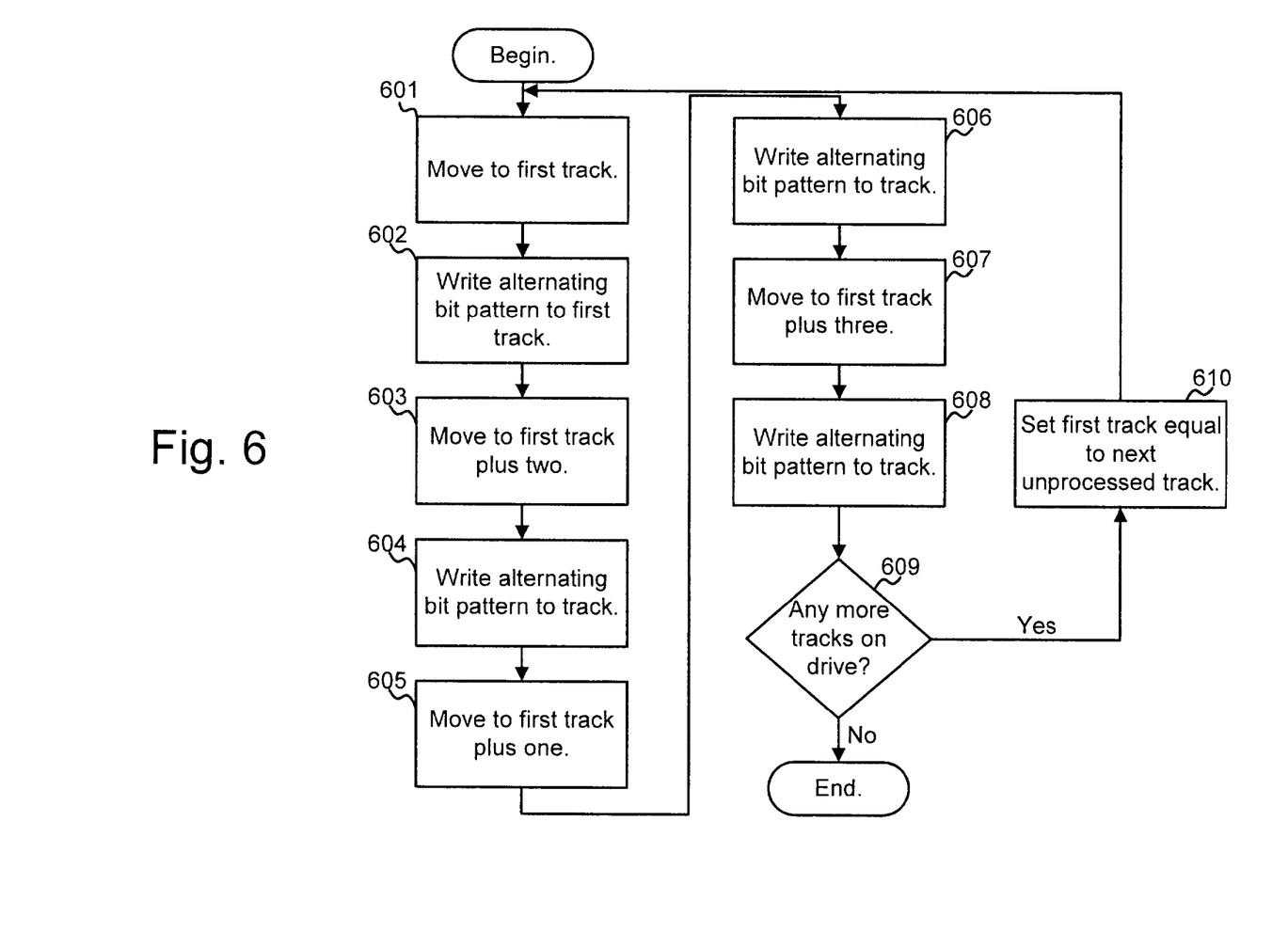
FIG. 6 is a flow chart illustrating operation of the cleaning device consistent with an aspect of the invention.

FIG. 6 is a flow chart illustrating the operation of cleaning device 300 consistent with an aspect of the present invention in additional detail. Cleaning device 300 begins, through microprocessor 410 and PLD 490, by moving the read/write head of the target disk drive to a first track of the disk drive (e.g., track one) (Act 601). An alternating pattern of bits (i.e., 010101 etc.) is then written to this track (Act 602). Once complete, the disk drive head is moved to the first track plus two (i.e., track three), (Act 603), and an alternating pattern of bits is written to this track (Act 604). Cleaning device 300 then instructs the head to move to the first track plus one (e.g., track two) (Act 605). An alternating bit pattern is written to this track (Act 606). Cleaning device 300 then instructs the head to move to the first track plus three (i.e., track four), (Act 607), and an alternating bit pattern is written to this track (Act 608). This process is repeated until all of the tracks have been written (Acts 609 and 610). For example, tracks five through eight may be the next set of tracks that are processed.

In one embodiment, the process shown in FIG. 6 is repeated multiple times. For a secure erase, each track may be written a minimum of seven times.

By alternating the overwriting of tracks as described in FIG. 6, cleaning device 300 introduces jitter into the read/write head of the disk drive. This jitter increases the likelihood that data at the fringe of the track will be overwritten, thus providing for secure data erasing.

The alternating system of erase shown in FIG. 6 is one of many potential cleaning pattern that specifically applies to moving magnetic media. In alternate implementations, cleaning device 300 may perform more simple cleans for fast "good enough" cleaning, or more complex patterns may be used that are specific to other types of media.

In an alternate cleaning scheme, some target disk drives have an internal command that will erase the drive. Cleaning device 300 may use these internal erase commands when cleaning the drive.

External Structure and Operation of the Cleaning Device

Figure 7:
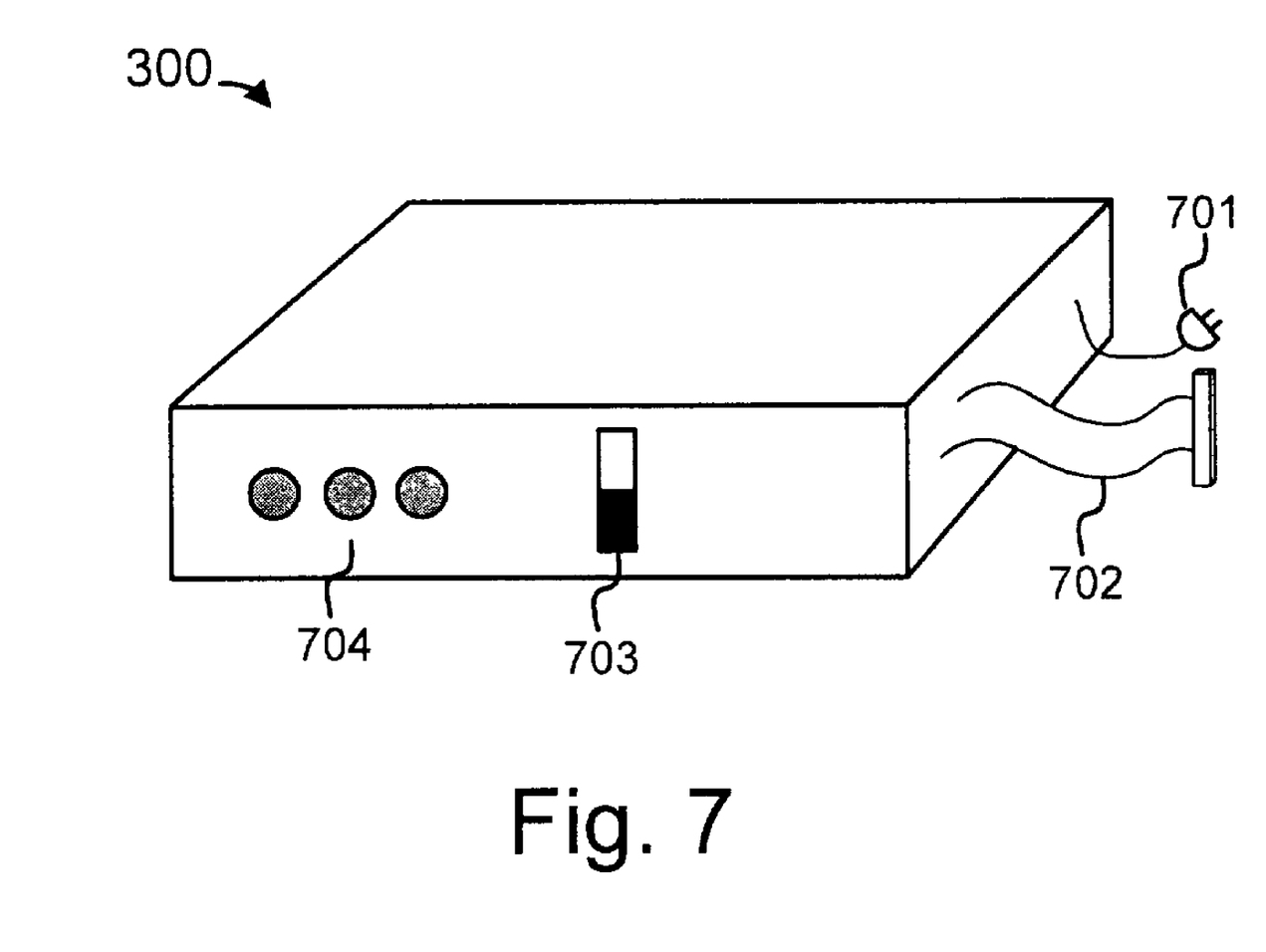
FIG. 7 is a diagram of an external view of an implementation of the cleaning device.

As previously mentioned, cleaning device 300 may be constructed in a relatively small case, such as a case as small or smaller than 8.5"×10"×1.5". FIG. 7 is a diagram illustrating an external view of one implementation of cleaning device 300 consistent with an aspect of the invention.

As shown in FIG. 7, the external portion of cleaning device 300 may include a power cord with a wall socket plug 701, an IDE drive cable 702 that is long enough to lead from cleaning device 300 to a computer, an on/off switch 703, and LED status lights 704. Alternatively, cleaning device 300 may include a battery compartment in place of or in combination with wall socket plug 701.

Figure 8:
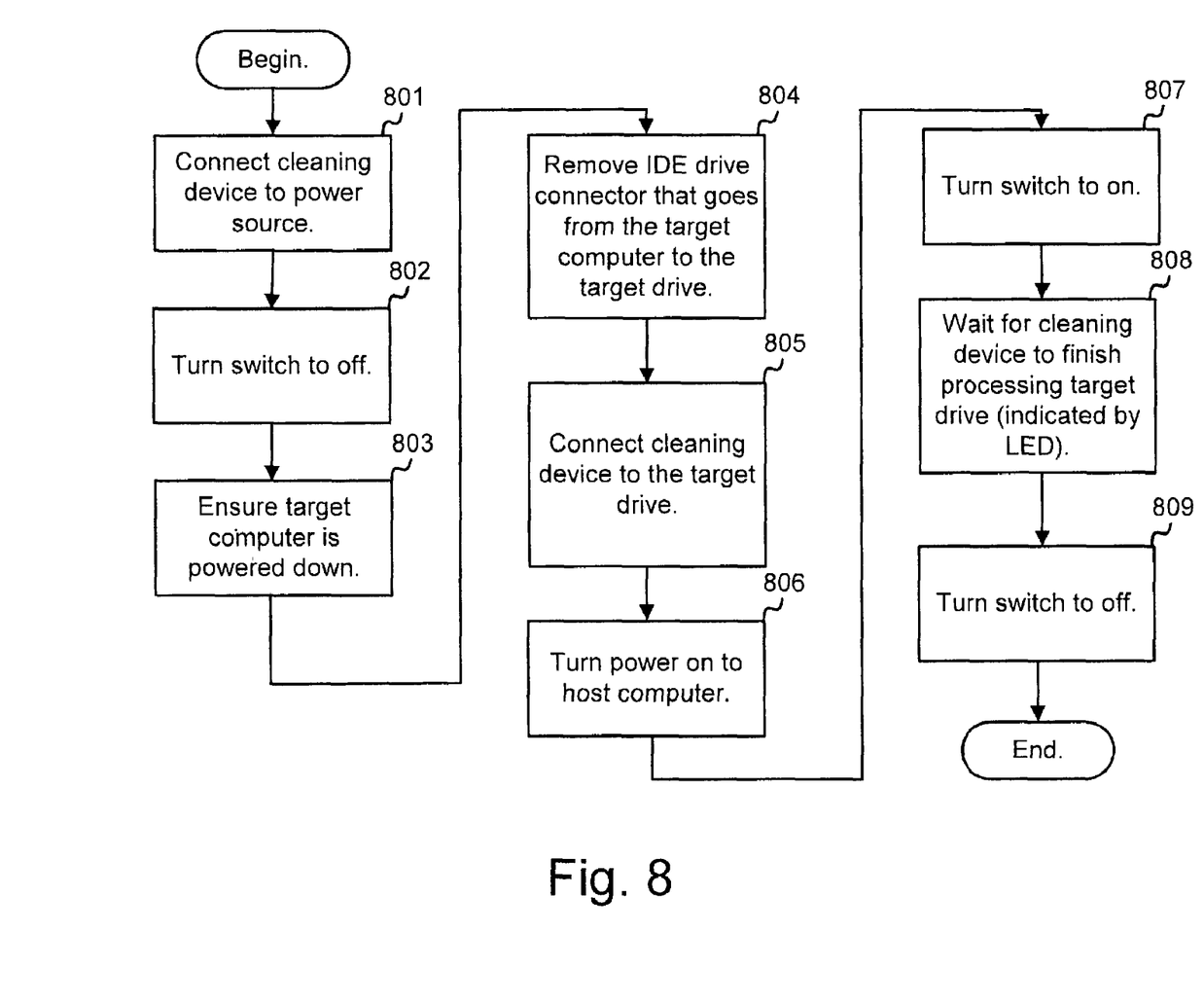
FIG. 8 is a flow chart illustrating operation of the cleaning device of FIG. 7 when cleaning a drive located within a host computer.

FIG. 8 is a flow chart illustrating operation of cleaning device 300, as shown in FIG. 7, from the prospective of a user when cleaning a hard disk drive located within a host computer.

A user begins by connecting cleaning device 300 to a power supply (Act 801) and ensuring that switch 703 is set to the "off" state (Act 802). In one implementation, this may involve plugging socket plug 701 into a wall power outlet. The user also ensures that the computer system with the target disk drive is powered down (Act 803). The user may then remove any IDE cables that are in the target drive (Act 804). This may involve removing the cover of the host computer and removing the IDE drive connector that connects the host computer and the drive. The user may then connect IDE drive cable 702 to the drive, turn power on to the host computer, and turn switch 703 to the "on" position (Acts 805, 806, and 807). In response, cleaning device 300 will power on and control the target drive to permanently delete its data. The cleaning may proceed as previously discussed with reference to FIG. 6. When cleaning device 300 has finished cleaning the drive, it signals cleaning completion via LED status lights 704 (Act 808). For example, one of LED status lights 704 may flash on and off while cleaning device 300 is operating. When cleaning device 300 completes operating, the LED status light may remain steadily on. The user may then turn switch 703 to the "off" position and disconnect the cleaning device from the host computer (Act 809).

Figure 9:
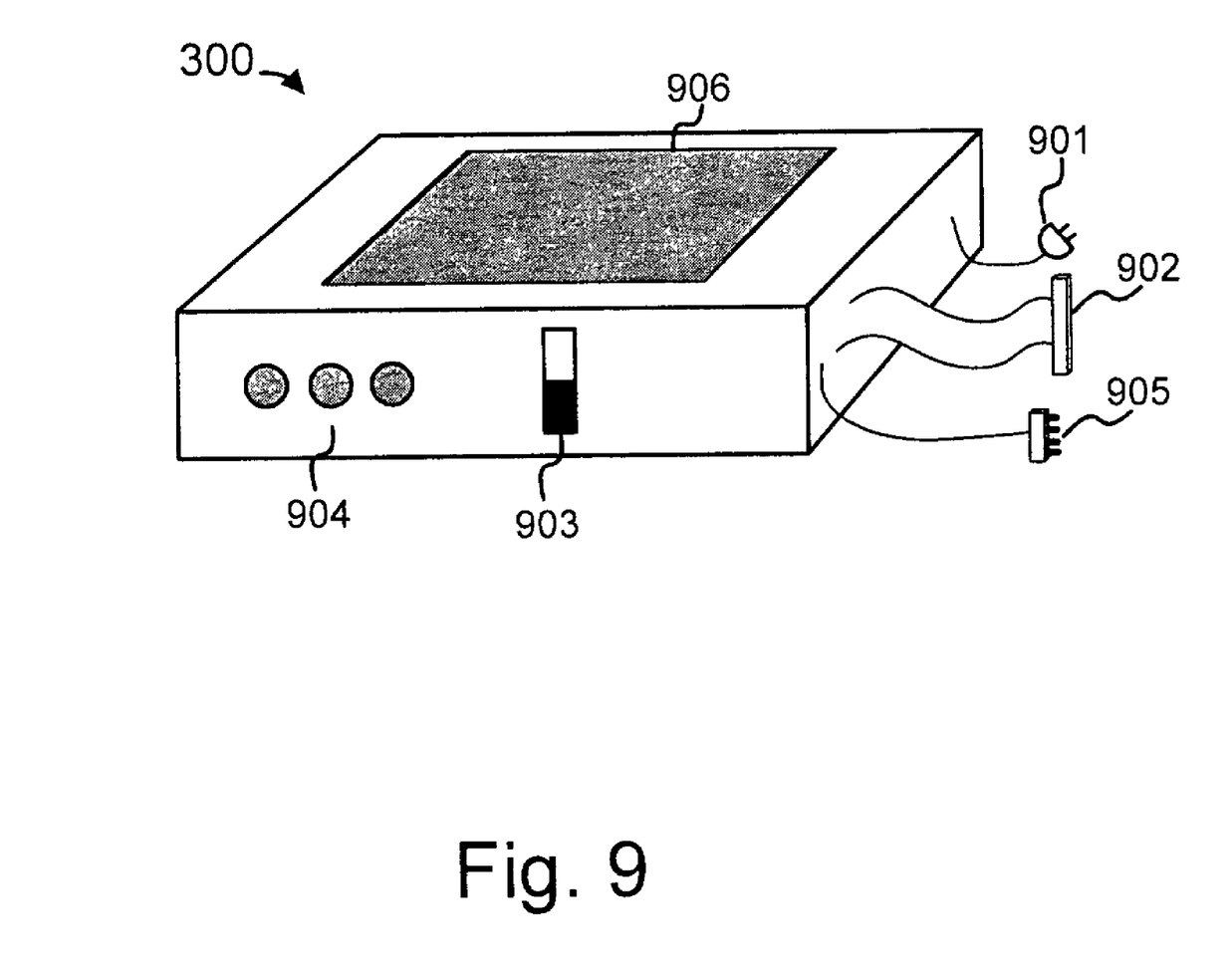
FIG. 9 is a diagram of external view of another implementation of the cleaning device.

FIG. 9 is a diagram illustrating an external view of another implementation of cleaning device 300 consistent with an aspect of the invention.

As shown in FIG. 9, the external portion of cleaning device 300 may include a power cord with a wall socket plug 901, an IDE drive cable 902, an on/off switch 903, LED status lights 904, a drive power cord 905, and an antistatic cushion 906. A target drive may be placed on the anti-static cushion and connected to the drive power cord 905 and the drive cable 902.

Figure 10:
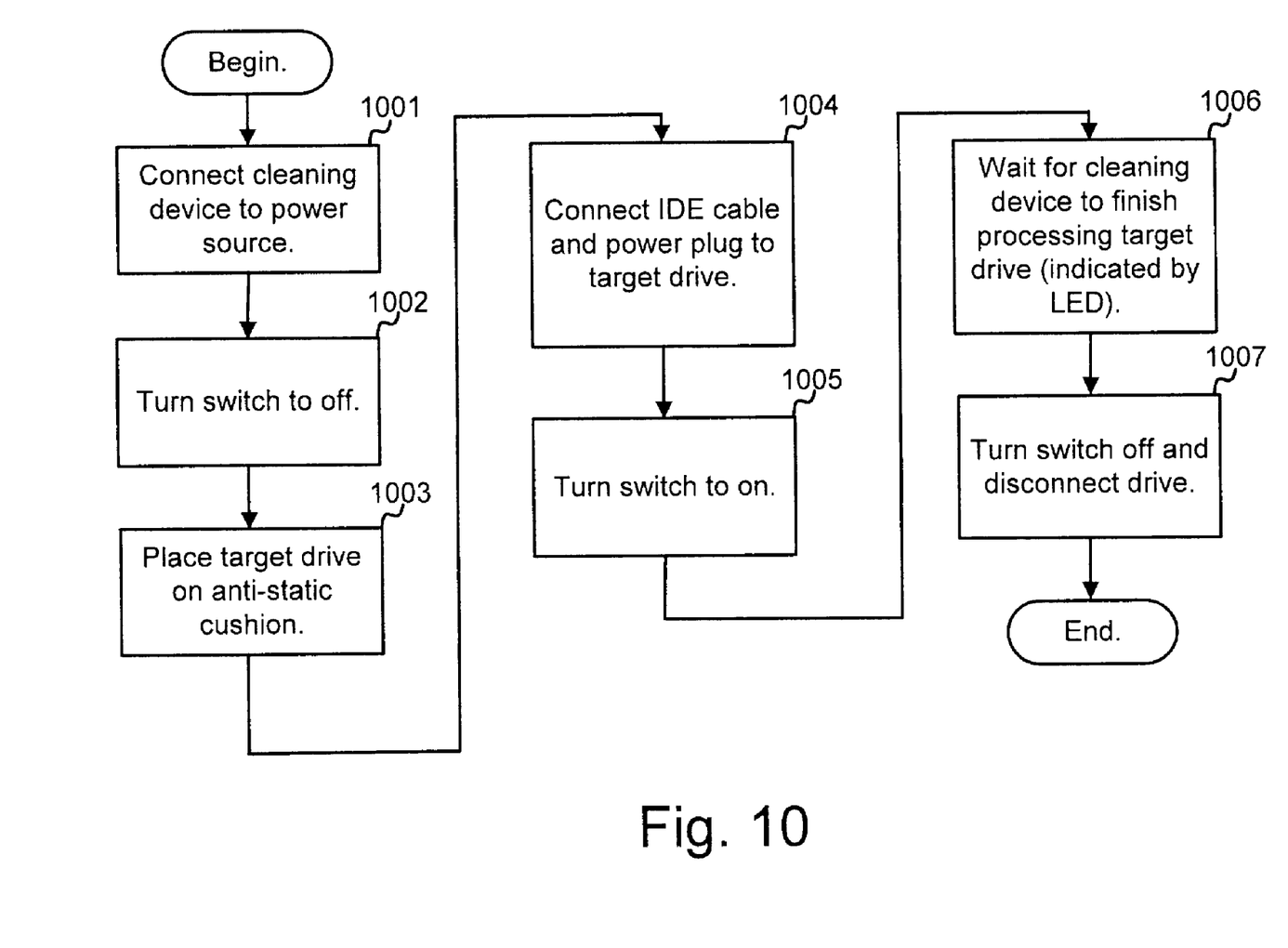
FIG. 10 is a flow chart illustrating operation of the cleaning device of FIG. 9 when cleaning a detached drive.

FIG. 10 is a flow chart illustrating operation of the cleaning device 300, shown in FIG. 9, from the prospective of a user when cleaning a detached hard disk drive.

A user begins by plugging socket plug 701 into a power supply (Act 1001) and ensuring that switch 703 is set to the "off" state (Act 1002). The target drive is then placed on the anti-static cushion 906, the IDE drive cable 902 plugged into the target drive, and the drive power cord 905 plugged into the target drive (Acts 1003 and 1004). The user may then turn switch 903 to the "on" position (Act 1005). In response, cleaning device 300 will power on and clean the drive in a manner similar to that described above with respect to FIG. 6. When cleaning device 300 has finished cleaning the drive, it signals cleaning completion via LED status lights 904 (Act 1006). The user may then turn switch 903 to the "off" position and disconnect the cleaning device and the target drive (Act 1007).

As can be appreciated, the operation of cleaning device 300, from the prospective of the user, is relatively simple. Accordingly, cleaning device 300 can be operated by only moderately trained technicians. Additionally, the operation simplicity of cleaning device 300 makes it unlikely that a user will improperly use the cleaning device in a manner that only partially erases a disk drive.

User Communication

In the implementations described above, cleaning device 300 signals its operational status to a user through LEDs 704 or 904. For example, LEDs may be used to signal that: (1) cleaning device 300 is performing operations of a target device, (2) cleaning device 300 has finished cleaning the target device, and (3) an error was encountered.

In alternate embodiments, cleaning device 300 may include additional display devices such as a graphical display or a connection to a printer. With these output devices, additional status information such as percentage of operations complete, time until operations are complete, and information about the target device may be displayed. The printer could be used to generate a continuous written record of the operations performed on the target device. This written record may include, for example, type of data removal performed, time and date of data removal, and information about the target device. In a similar implementation, cleaning device 300 could interact with a host computer through serial interface 330 to upload status information to the host computer. The status information may be uploaded in real-time as the cleaning device operates or in a batch mode in which information relating to multiple target drives may be uploaded at one time.

Additional Features

In the implementations described above, cleaning device 300 has its level of data removal security set in hardware. The level of data removal security may be determined by the number of passes (i.e., the number of times the process shown in FIG. 6 is repeated) cleaning device 300 makes over the target device. In an alternate embodiment, cleaning device 300 may include a switch that a user can set to vary the cleaning level. Cleaning device 300 would then vary its number of cleaning passes based on the switch setting.

Some target drives may contain data that the drive has been instructed to classify as "hidden" data. For example, a command supported by many commercially available hard drives allows a skilled programmer to reserve a portion of the storage media. Once reserved, this area of the media is effectively hidden from the computer by the drive. Standard queries about the amount of storage on the drive return the full amount of storage minus the reserved amount. This prevents standard data removal methods from working as the computer is unaware that there is hidden data.

In one implementation, cleaning device 300 may issue appropriate commands to target drives that contain hidden data to release the hidden data. Cleaning device 300 may automatically issue these commands without the need for human intervention, thus making the entire contents of the drive accessible for data removal. In situations where the hidden data is protected by a password, the operator of cleaning device 300 may be informed that the device is protected by a password and that additional steps are necessary to complete the data removal.

In yet another implementation, cleaning device 300 could have multiple drive interface cables, through which it could simultaneously clean two or more target devices.

Still further, cleaning device 300, after erasing a target drive, may partition and/or format the target drive. For example, cleaning device 300, after erasing a target drive, may then automatically partition the drive into a single partition and format the drive under FAT32 drive format. In additional embodiments, cleaning device 300 may proceed, after formatting the target drive, to copy an image to the drive that defines an operating system. This may help to speed up the process of reusing drives in refurbished computer systems.

Although the cleaning device discussed above was primarily described as cleaning an IDE device, in other implementations, long-term storage devices having other interfaces, such as FireWire, USB2, or SCSI could be cleaned using concepts similar to those discussed herein.

CONCLUSION

As described above, a cleaning device permanently removes data from a target long-term memory device. The cleaning device is portable, provides easy to understand user feedback, has a simple user interface and could thus be effectively used by non-technical people.

The cleaning device has a number of advantages. It is operating system independent. The cleaning device can operate while the target device is still in the host computer system or when it has been removed from the host computer system. It is a stand alone device that can replace more complicated and more expensive devices or systems. Additionally, the cleaning device does not require that the operator have any particular knowledge of the target device; it detects the capabilities and settings of the target device and adjusts the operating parameters for optimal performance without user intervention.

Still further, the cleaning device removes data from all partitions on the target device, regardless of the data's format, and removes any reserved or protected data areas, so that all of the data storage areas on the target device are available for cleaning without requiring user intervention. Additionally, the cleaning device can provide different levels of data removal. The longer the cleaning device performs operations on a target device, the more securely it is able to remove data. The cleaning device provides feedback to a user that it has either performed operations correctly or has run into an error.

It will be apparent to one of ordinary skill in the art that the embodiments as described above may be implemented in many different forms of software, firmware, and hardware in the implementations illustrated in the figures. The actual software code or specialized control hardware used to implement aspects consistent with the present invention is not limiting of the present invention. Thus, the operation and behavior of the embodiments were described without specific reference to the specific software code, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. Moreover, while a series of acts have been presented with respect to FIGS. 6, 8, and 10, the order of the acts may be different in other implementations consistent with the present invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A stand-alone, dedicated function device for removing data from a long-term memory component, comprising:
   an interface for connecting the stand-alone, dedicated function device to the long-term memory component;
   a control circuit configured to control the long-term memory component through the interface to irretrievably remove data from the long-term memory component without regard to data content or data storage format of the data on the long-term memory component by overwriting the data of the long-term memory component;
   a user controllable switch that, when actuated by a user, causes the control circuit to commence irretrievably removing all the data from the long-term memory component;
   a casing configured to contain the control circuit and the interface, the casing being of a size that is portable by the user;
   a power supply configured to supply power to the control circuit;
   wherein the control circuit is further configured to open a hidden storage area on the long-term memory component before irretrievably removing the data.

2. The device of claim 1, wherein the control circuit open a hidden storage area without user intervention.

3. The device of claim 1, wherein the control circuit notifies a user when the opening a hidden storage area requires a password for release.

* * * * *

UNITED STATES PATENT AND TRADEMARK OFFICE
Certificate

Patent No. 7,228,379 B2                                                            Patented: June 5, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Steven Bress, Germantown, MD (US); and Mark Joseph Menz, Folsom, CA (US).

Signed and Sealed this Sixth Day of September 2011.

MANO PADMANABHAN
*Supervisory Patent Examiner*
Art Unit 2188
Technology Center 2100